United States Patent [19]

Fukuzumi

[11] Patent Number: 5,758,121
[45] Date of Patent: May 26, 1998

[54] DATA STORAGE SECURITY APPARATUS AND METHOD WHICH ERASES MEMORY AND UTILIZES A POWER SWITCH TO CUT-OFF ELECTRIC POWER DURING UNSUCCESSFUL ACCESS

[75] Inventor: Tomoya Fukuzumi, Tokyo, Japan

[73] Assignee: Mitsubishi Denki Kabushiki Kaisha, Tokyo, Japan

[21] Appl. No.: 581,228

[22] Filed: Dec. 29, 1995

[30] Foreign Application Priority Data

Aug. 24, 1995 [JP] Japan ................... 7-215761

[51] Int. Cl.$^6$ ............................................. G06F 12/14
[52] U.S. Cl. ........................... 395/491; 395/750; 395/186
[58] Field of Search .......................... 395/442, 833, 395/186, 187.01, 188.01, 490, 491, 750, 311, 477, 479, 726; 371/40.1

[56] References Cited

U.S. PATENT DOCUMENTS

| | | | |
|---|---|---|---|
| 5,016,223 | 5/1991 | Kimura et al. | 365/229 |
| 5,237,609 | 8/1993 | Kimura | 380/3 |
| 5,239,166 | 8/1993 | Graves | 235/380 |
| 5,265,048 | 11/1993 | Kimura | 365/189.01 |
| 5,361,228 | 11/1994 | Adachi et al. | 365/189.03 |
| 5,432,939 | 7/1995 | Blackledge, Jr. et al. | 395/700 |
| 5,572,696 | 11/1996 | Sonobe | 395/412 |
| 5,579,502 | 11/1996 | Konishi et al. | 395/430 |

*Primary Examiner*—Matthew M. Kim

[57] ABSTRACT

When a connector of a data storage device 10 is connected to a connector 104 of a data processor 100, a power is supplied to a microprocessor 24, and the data storage device 10 sends a discrimination signal to the data processor 100. If the discrimination signal is decided to be a prescribed signal, the data processor 100 sends a detection signal to the data storage device 10. If the detection signal is not received or it is not decided to be a prescribed one, the microprocessor 24 makes a card mode controller 16 inactive to inhibit data read from a memory section 14, and it vanishes the data stored in the memory section 14.

13 Claims, 2 Drawing Sheets

DATA STORAGE SECURITY APPARATUS AND METHOD WHICH ERASES MEMORY AND UTILIZES A POWER SWITCH TO CUT-OFF ELECTRIC POWER DURING UNSUCCESSFUL ACCESS

BACKGROUND OF THE INVENTION

1. Field of the Invention

The present invention relates to a data processor such as an office automation equipment or a personal computer having a security function on data read from a data memory device which can be connected to the data processor.

2. Description of the Prior Art

Recently, integrated circuit IC cards as well as floppy disk drives, hard disk drives and photomagnetic disk drives are used as an external memory for a data processor such as an office automation equipment or a personal computer. An IC card can be connected to a data processor such as a personal computer as an external memory. In a system including an IC card and a data processor such as a personal computer, they follow a prescribed specification as to the connection between them. Therefore, data written to the IC card using the prescribed specification can be read by all data processors using the same specification. Therefore, a prior art data processor has a problem that it cannot maintain the secrecy of data stored in an IC card.

SUMMARY OF THE INVENTION

An object of the present invention is to provide a data processor to keep data secret to a high degree.

A data storage unit such as an IC card according to the invention can be connected with a connector to a data processor such as a personal computer. The data storage unit has a storage device for a storing data, and a storage controller controlling the storage device. Further, it has a security controller for a security function, and the controller sends a discrimination signal to the data processor for identifying the IC card, and receives a detection signal from the data processor for identifying the data processor. The discrimination signal and the detection signal can be generated only by a data storage unit and by a data processor which have been designed for the security function. The controller erases the data stored in the storage device when a prescribed detection signal is not received from the data processor connected with the data storage unit. Preferably, the security controller inactivates the storage controller when a prescribed detection signal is not received from the data processor.

An advantage of the present invention is that the data in the data storage unit cannot be read illegitimately by a data processor. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
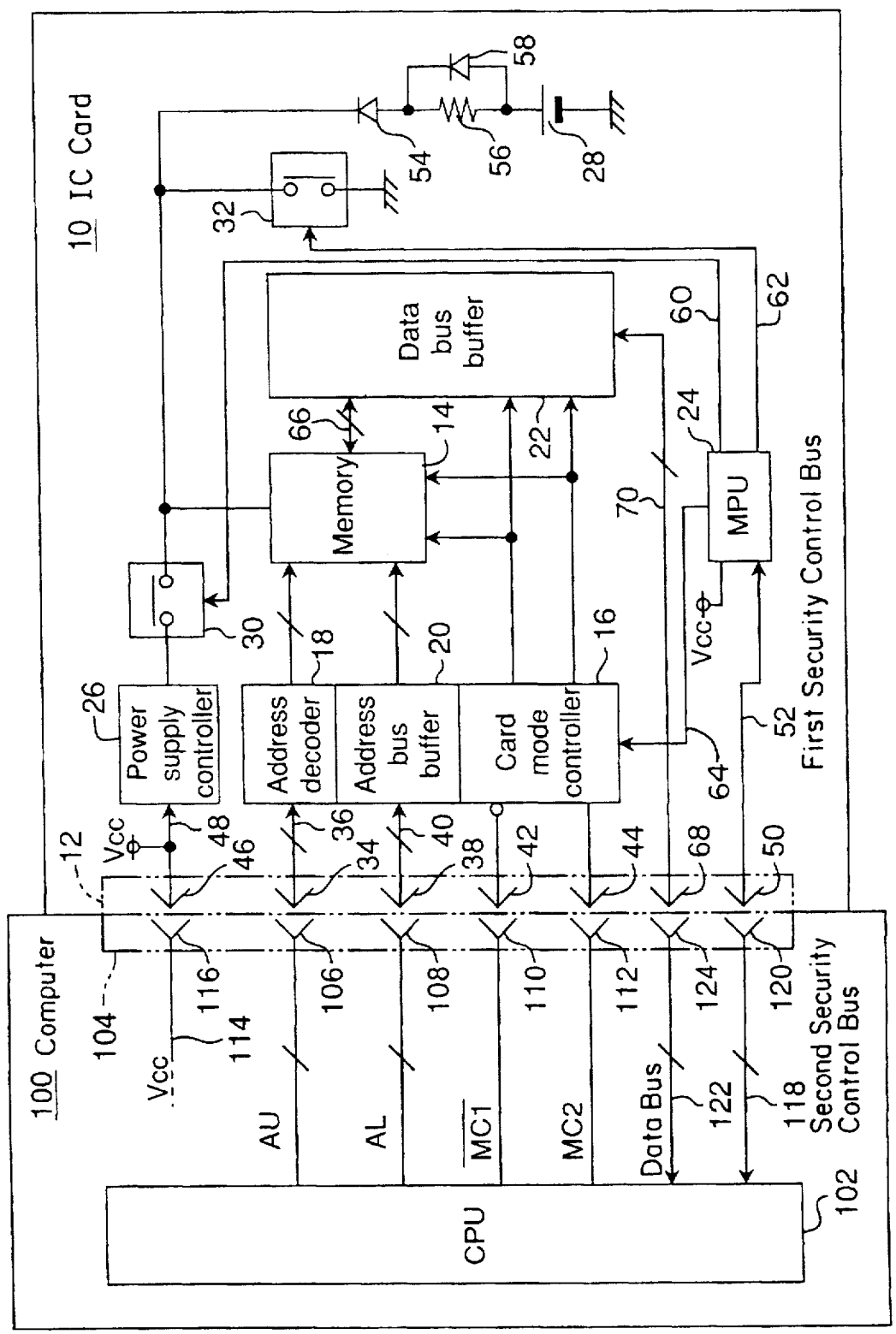
FIG. 1 is a block diagram of a system of an embodiment of the invention including an IC card and a data processor.

Referring now to the drawings, wherein like reference characters designate like or corresponding parts throughout the several views, FIG. 1 shows a data processing system as an embodiment of the invention. The system includes a data processor such as a personal computer 100 and a data storage unit such as an IC card 10 which can be inserted into a slot of the personal computer 100. The personal computer 100 has a security function for protecting data stored in the IC card 10, while the IC card 10 also has a security function for protecting data stored therein. The personal computer 100 has a connector 104 according to a prescribed specification. A connector 12 of the IC card 10 is connected to the connector 104 in a detachable way.

In the IC card 10, a memory section 14 stores data, and it usually includes a plurality of memory elements. A card mode controller 16 controls data written to and data read from the memory section 14. An address decoder 18 and an address bus buffer 20 specify one of the memory elements and an address of the memory section 14, respectively. A data bus buffer 22 stores data read from the memory section 14 temporarily. A feature of the IC card 10 is that it includes a microprocessor 24 for a security function. As will be explained in detail below, the microprocessor 24 sends a discrimination signal to the personal computer 100 and receives a detection signal from the personal computer 100 via first and second security control buses 52, 118 in correspondence to the discrimination signal. The IC card 10 further includes power supply controller 26, a battery 28 for back-up of data, and switches 30 and 32 for controlling power supply to the memory section 14 by the microprocessor 24.

The personal computer 100 includes a central processing unit (CPU) 102 which supplies upper bits of an address signal (hereinafter referred to as "address signal AU") through a connection part 106 in the connector 104, a connection part 34 in the connection part 12 of the IC card 10 and an address bus 36. Then, the address decoder 18 selects one of the memory elements in the memory section 14 in correspondence to the address signal AU. On the other hand, the CPU 102 in the personal computer 100 supplies lower bits of an address signal (hereinafter referred to as "address signal AL") through a connection part 108 of the connecter 104, a connection part 38 in the connector 12 of the IC card 10 and an address bus 40 to the address bus buffer 20. Then, the address bus buffer 20 specifies an address for the memory section 14 in correspondence to the address signal AL.

The CPU 102 supplies mode control signals $\overline{MC1}$ and MC2 to the card mode controller 6. The mode control signals $\overline{MC1}$ and MC2 are sent through connection parts 110 and 112 in the connector 104 of the personal computer 100 and connection parts 42 and 44 of the connector 12 of the IC card 10 to the card mode controller 16. The card mode controller 16 controls the data written to and the data read from the memory section 14 according to the mode control signals $\overline{MC1}$ and MC2. The card mode controller 6 becomes active or inactive according to a signal from the microprocessor 24.

A power supply voltage $V_{CC}$ is supplied through a power supply line 114 of the personal computer 100, a connection part 116 of the connector 104, a connection part terminal 46 of the connection part 12 of the IC card 10 and a power supply line 48 to the microprocessor 24 and the power supply controller 26. The microprocessor 24 and the CPU 102 of the personal computer 100 are connected to each other through a second security control bus 118, a connection part 120 of the connector 104, a connector 50 of the connection part 12 of the IC card 10 and a first security control bus 52.

The power supply controller 26 controls the voltage $V_{CC}$ at a prescribed voltage, and supplies it to the memory section 14, the card mode controller 16, the address decoder 18, the address bus buffer 20 and the data bus buffer 22 in the IC card 10. The switch 30 is connected between the output of the power supply controller 26 and a power supply terminal of the memory section 14, while the switch 32 is connected between the power supply terminal of the memory section 14 and the ground. The power supply voltage of the memory section 14 is also connected to an anode of a diode 54, while a cathode thereof is connected to an end of a resistor 56 and to a cathode of another diode 58. The other end of the resistor 56 and an anode of the diode 58 are connected to a positive terminal of the battery 28, a negative terminal thereof being connected to the ground. The turn-on-and-off of the switches 30 and 32 are controlled by the microprocessor 24 through signal lines 60 and 62. The microprocessor 24 also supplies a signal through a line 64 inactivate the card mode controller 16. The memory unit 14 is connected through a bus 66 to the data bus buffer 22. The CPU 102 in the personal computer 100 is connected to the data bus buffer 22 through a data bus 122, a connection part 124 in the connector 104, a connection part 68 in the connector 12 and a data bus 70.

The microprocessor 24 in the IC card 10 communicates with the personal computer 100 through the first and second security control buses 52 and the by sending the discrimination signal and receiving the detection signal. The discrimination signal represents that the IC card 10 is an IC card having a security function, and it has codes of a prescribed sequence determined in correspondence to the IC card 10 having the security function. The detection signal represents that the personal computer 100 is a personal computer having the security function, and it has codes of a prescribed sequence determined in correspondence to the personal computer 100 having the security function. When the IC card decides that a data processor connected to the IC card is not a data processor having the security function, it destructs or erases the data stored therein so that a third party cannot read the data illegitimately.

Figure 2:
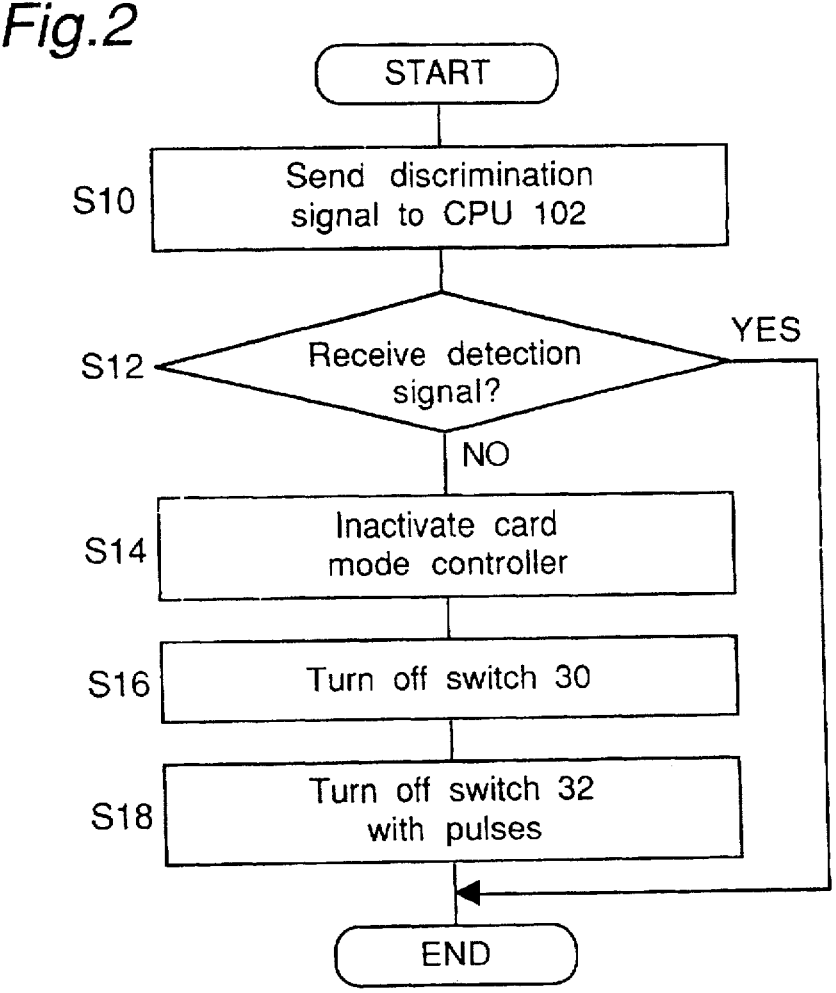
FIG. 2 is a flowchart of an IC card for security control.
Figure 3:
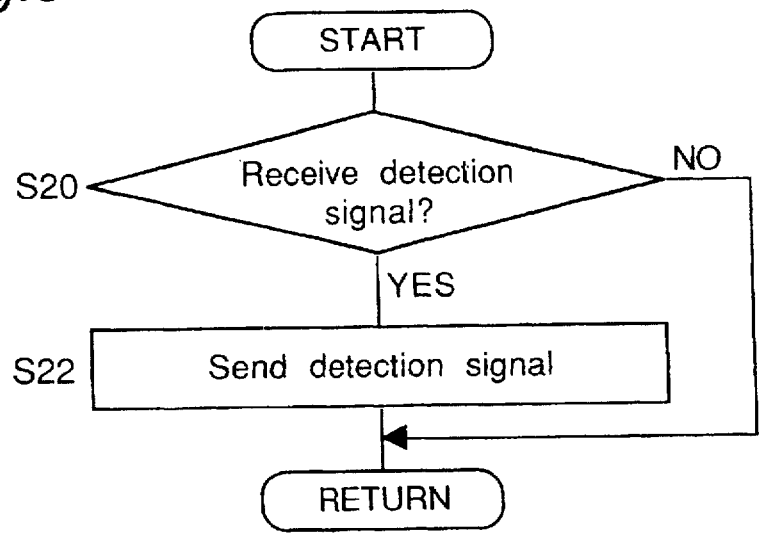
FIG. 3 is a flowchart of a personal computer for security control.

FIGS. 2 and 3 are flowcharts showing the security function performed by the microprocessor 24 in the IC card 10 and by the CPU 102 in the personal computer 100. As shown in FIG. 2, when the microprocessor 24 is activated in accordance to power supply from the personal computer 100, it first sends a discrimination signal through the second security control bus 52 to the CPU 102 (step S10). On the other hand, as shown in FIG. 3, the CPU 102 checks if a discrimination signal is received through the first security control bus 118 (step S20). This flow is performed, for example, when the personal computer 100 is turned on. If a discrimination signal is decided to be received within a predetermined time and to be a prescribed discrimination signal, a detection signal is sent through the first and second security control buses 52, 118 to the microprocessor 24 (step S22). Then, as shown in FIG. 2, if the microprocessor 24 decides that a detection signal is not received within a predetermined time or a received signal is not a prescribed detection signal (step S12), it inactivates the card mode controller 16 (step S14). Further, it turns off the switch 30 to shut off the power supply from the personal computer 100 (step S16). Finally, it turns on and off the switch 32 with pulse signals to erase the contents stored in the memory section 14 (step S18), or it otherwise destroys the data stored in the memory section 14.

The operation for security function in the system shown in FIG. 1 is explained further. When the connector 12 of the IC card 10 is connected to the connector 104 of the personal computer 100, the power supply voltage $V_{CC}$ is supplied to the microprocessor 24 in the IC card 10. Then, the microprocessor 24 sends a discrimination signal to the CPU 102 of the personal computer 100. The discrimination signal has codes of a prescribed sequence determined in correspondence to the IC card 10 having the security function. Then, the CPU 102 decides if the discrimination signal has the prescribed sequence determined in correspondence to the IC card 10. That is, the CPU 102 decides if the IC card 10 connected to the connector 104 is an IC card 10 having the security function.

When the CPU 102 decides that the discrimination signal received from the IC card 102 has the prescribed sequence determined in correspondence to the IC card 10, it sends a detection signal to the microprocessor 24 in the IC card 10. The detection signal has codes of a prescribed sequence determined in correspondence to the personal computer 100 having the security function. Then, the microprocessor 24 decides if the discrimination signal has the prescribed sequence determined in correspondence to the personal computer 100. When the microprocessor 24 decides that the detection signal is received from the personal computer 100 having security function, it makes the card mode controller 16 active. Thus, the data write mode and the data read mode of the memory section 14 in the IC card 10 are controlled according to the mode control signals $\overline{MC1}$ and MC2, and the data can be read from the IC card 10 to the personal computer 100.

On the contrary, when a person gets the IC card 10 and inserts it into a personal computer without the security function, the power supply voltage $V_{CC}$ is supplied to the microprocessor 24 in the IC card 10. Then, the microprocessor 24 sends a discrimination signal to the personal computer. However, the personal computer does not have a bus line which receives the discrimination signal at the connector 104, so that it cannot receive the discrimination signal. Further, because it cannot generate a detection signal in correspondence to the discrimination signal, when the IC card 10 is connected to a personal computer without security function, the IC card 10 never receives the detection signal from the personal computer.

When the detection signal is not received, the IC card is being used illegitimately to read the data stored therein. Therefore, the microprocessor 24 inactivates the card mode controller 16, so as to inhibit the generation of the mode control signals $\overline{MC1}$ and MC2 or to inhibit data read and data write operations. Then, the microprocessor 24 turns off the switch 30 to shut off the power supply from the personal computer 100 to the memory section 14, while it turns on and off the other switch 32 with pulse signals to shut off the power supply from the back-up battery 28 in the IC card 10. Thus, the data stored in the memory section 14 are deleted.

As described above, even if a person gets the IC card 10 having security function illegitimately, the data stored in the IC card 10 cannot be read with a general personal computer without the security function. Further, when the IC card 10 is connected, the data stored in the IC card 10 is erased electrically. Thus, a high security protection can be provided with a rather simple structure.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A data storage unit, comprising:

a connector including a prescribed specification for connecting the data storage unit with a data processor;

a storage device for storing data;

a storage controller controlling said storage device according to a control signal received through said connector from the data processor;

a security controller sending a discrimination signal through said connector to the data processor for identifying said data storage unit, receiving a detection signal in response to the discrimination signal through said connector from the data processor for identifying the data processor, and erasing the data stored in said storage device when the detection signal received from the data processor in response to the discrimination signal is not a prescribed detection signal;

a power controller controlling an electric power supplied from the data processor via said connector and supplying the electric power to a power supply terminal of said storage device;

a back-up battery device connected to the power supply terminal of said storage device;

a first switch connected between said power controller and the power supply terminal of said storage device;

a second switch connected between the power supply terminal of said storage device and ground; and wherein said first switch is opened and the second switch is opened and closed in a prescribed sequence according to a signal from said security controller to cut off the electric power from the data processor to said storage device and to thereby erase the data stored in said storage device.

2. The data storage unit according to claim 1, wherein the discrimination signal includes codes with a sequence specified in correspondence to said data storage unit, and the detection signal includes codes with a sequence which makes it possible to identify the data processor.

3. The data storage unit according to claim 1, wherein said security controller inactivates said storage controller when a prescribed detection signal is not received from the data processor.

4. The data storage unit according to claim 1, wherein the data storage unit is an IC card.

5. The data storage unit according to claim 1, wherein the data processor includes a personal computer.

6. A data storage device for securing data stored therein against unauthorized access from a data processor, comprising:

a connector connecting the data storage device and the data processor;

a memory device storing data;

a controller controlling a flow of data between said memory device and the data processor;

a microprocessor connected to said controller and receiving data requests from the data processor;

a security control bus connected to said microprocessor and said connector;

a data bus connected to said memory device and said connector, said data bus transmitting data stored in said memory device;

wherein when the data storage device is connected to the data processor via said connector, said microprocessor sends a discrimination signal that identifies the data storage device via said security control bus and said connector to the data processor;

wherein if said microprocessor does not receive a prescribed detection signal from the data processor via said security control bus after sending the discrimination signal, then said microprocessor erases the data stored in said memory device;

a power supply line providing electrical power to the data storage device from the data processor;

a first switch connected between said power supply line and a power supply terminal of said memory device;

wherein if said microprocessor does not receive the prescribed detection signal from the data processor via said security control bus after sending the discrimination signal, then said microprocessor instructs said first switch to open and thereby shut-off the electrical power to said memory device;

a back-up battery device;

a second switch connected between said back-up battery device and the power supply terminal of said memory device; and wherein if said microprocessor does not receive the prescribed detection signal from the data processor via said security control bus after sending the discrimination signal, then said microprocessor instructs said second switch with pulse signals to erase the data stored in said memory device.

7. The data storage device according to claim 6, wherein if said microprocessor does not receive a prescribed detection signal from the data processor via said security control bus after sending the discrimination signal, then said microprocessor inactivates said controller to prevent data flow via said data bus from said memory device to said data processor.

8. The data storage device according to claim 6, wherein the discrimination signal includes codes having a sequence specified in correspondence to said data storage device, and the detecting signals includes codes with a sequence for identifying the data processor.

9. The data storage device according to claim 6, wherein an IC card incorporates said data storage device.

10. The data storage device according to claim 6, wherein the data processor is part of a computer.

11. A data storage device for securing data stored therein against unauthorized access from a data processor, comprising:

a connector connecting the data storage device and the data processor;

a memory device storing data;

a controller controlling a flow of data between said memory device and the data processor;

a microprocessor connected to said controller and receiving data requests from the data processor;

a security control bus connected to said microprocessor and said connector;

a data bus connected to said memory device and said connector, said data bus transmitting data stored in said memory device;

a power supply line providing electrical power to the data storage device from the data processor;

a first switch connected between said power supply line and a power supply terminal of said memory device;

wherein when the data storage device is connected to the data processor via said connector, said microprocessor sends a discrimination signal that identifies the data storage device via said security control bus and said connector to the data processor;

wherein if said microprocessor does not receive the prescribed detection signal from the data processor via said security control line after sending the discrimination signal, then said microprocessor instructs said first switch to open and thereby shut-off the electrical power to said memory device;

a second switch connected between a back-up battery device and the power supply terminal of said memory device; and wherein if said microprocessor does not receive the prescribed detection signal from the data processor via said security control line after sending the discrimination signal, then said microprocessor instructs said second switch with pulse signals to erase the data stored in said memory device.

12. The data storage device according to claim 11, wherein the discrimination signal includes codes having a sequence specified in correspondence to said data storage device, and the detecting signals includes codes with a sequence for identifying the data processor.

13. The data storage device according to claim 11, wherein an IC card incorporates said data storage device.

* * * * *